United States Patent
Park et al.

(10) Patent No.: US 8,220,826 B2
(45) Date of Patent: Jul. 17, 2012

(54) RAMP BRACKET FOR CURTAIN AIRBAG OF VEHICLE

(75) Inventors: Sung Yong Park, Hwaseong-si (KR); Chang Jin Oh, Hwaseong-si (KR); Dae Young Kwak, Yongin-si (KR); Chang Hyun Lim, Bucheon-si (KR); Woo Hyun Lim, Gunpo-si (KR); Tae Woo Kim, Jinju-si (KR); Hee Sang An, Cheongju-si (KR); Gyeong Won Jeong, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 112 days.

(21) Appl. No.: 12/832,744

(22) Filed: Jul. 8, 2010

(65) Prior Publication Data

US 2011/0127754 A1 Jun. 2, 2011

(30) Foreign Application Priority Data

Dec. 1, 2009 (KR) .................. 10-2009-0117768

(51) Int. Cl.
*B60R 21/201* (2006.01)
*B60R 21/213* (2006.01)
*B60R 21/215* (2006.01)
*B60R 21/232* (2006.01)

(52) U.S. Cl. .................. 280/728.2; 280/730.2
(58) Field of Classification Search .............. 280/728.2, 280/730.2, 730.1, 728.1
See application file for complete search history.

(56) References Cited

U.S. PATENT DOCUMENTS

| | | | |
|---|---|---|---|
| 6,305,707 B1 * | 10/2001 | Ishiyama et al. | 280/728.2 |
| 6,439,598 B1 * | 8/2002 | Braun et al. | 280/728.2 |
| 7,213,836 B2 * | 5/2007 | Coon et al. | 280/730.2 |
| 7,322,601 B2 * | 1/2008 | Bertossi | 280/730.2 |
| 7,401,805 B2 * | 7/2008 | Coon et al. | 280/730.2 |
| 7,597,345 B1 * | 10/2009 | Kim | 280/728.2 |
| 7,607,685 B2 * | 10/2009 | Jang et al. | 280/730.2 |
| 7,677,593 B2 * | 3/2010 | Downey | 280/728.2 |
| 7,976,055 B2 * | 7/2011 | Son | 280/728.2 |
| 2003/0230878 A1 * | 12/2003 | Inoue | 280/730.2 |
| 2006/0119084 A1 * | 6/2006 | Coon et al. | 280/730.2 |
| 2006/0138750 A1 * | 6/2006 | Park | 280/728.2 |
| 2007/0132217 A1 * | 6/2007 | Seong | 280/730.2 |
| 2009/0085329 A1 * | 4/2009 | Kwak et al. | 280/728.2 |
| 2011/0115199 A1 * | 5/2011 | Shimazaki et al. | 280/728.2 |

FOREIGN PATENT DOCUMENTS

| | | | |
|---|---|---|---|
| KR | 2000-0077050 | * | 6/2002 |
| KR | 2004-0049629 | * | 1/2006 |
| KR | 2006-0015270 | * | 8/2007 |
| KR | 2007-0064338 | * | 5/2008 |

(Continued)

*Primary Examiner* — Ruth Ilan
*Assistant Examiner* — Keith Frisby
(74) *Attorney, Agent, or Firm* — Morgan, Lewis & Bockius LLP

(57) ABSTRACT

A ramp bracket for a curtain airbag cushion of a vehicle may include a cushion storage portion storing the curtain airbag cushion therein, the cushion storage portion having an opening on a first sidewall thereof such that the curtain airbag cushion is deployed through the opening, wherein the first sidewall includes upper and lower surfaces to define the opening, and a shock absorption portion formed under a lower surface of the cushion storage portion and absorbing a shock generated when a passenger collides to the shock absorption portion.

5 Claims, 4 Drawing Sheets

FOREIGN PATENT DOCUMENTS

| | | | |
|---|---|---|---|
| KR | 2007-0036935 | * | 10/2008 |
| KR | 2008-0043396 | * | 11/2009 |
| KR | 2008-0043506 | * | 11/2009 |
| KR | 2008-0072756 | * | 2/2010 |

* cited by examiner

RAMP BRACKET FOR CURTAIN AIRBAG OF VEHICLE

CROSS-REFERENCE TO RELATED APPLICATIONS

The present application claims priority to Korean Patent Application Number 10-2009-0117768 filed on Dec. 1, 2009, the entire contents of which application is incorporated herein for all purpose by this reference.

BACKGROUND OF THE INVENTION

1. Field of the Invention

The present invention relates generally to ramp brackets for curtain airbags of vehicles and, more particularly, to a ramp bracket for a curtain airbag of a vehicle in which an inner surface of a cushion storage portion is round and a shock absorption portion is provided under the cushion storage portion, thus enhancing the deployment performance and the shock absorption performance of a curtain airbag.

2. Description of Related Art

Generally, airbag systems for vehicles are safety devices for protecting drivers or passengers from impact and for preventing injuries. Such an airbag system typically includes a sensor which can sense impact force generated when a collision occurs or a sudden stop when traveling at high speed. When an accident occurs, inflation gas is injected into an airbag cushion following the signal of a sensor detecting the impact, thus rapidly inflating the airbag cushion to optimally protect a driver or passenger.

Meanwhile, when a vehicle is involved in a side collision, if a roof rail portion of the vehicle is severely deformed and thereby greatly protrudes into the passenger compartment of the vehicle, the possibility of an injury to the head of a driver or passenger resulting is increased. To avoid this problem, recently, a curtain airbag which protects the driver or passenger from impact applied to the driver or passenger in the lateral direction is used.

As shown in FIG. 1, typically, a curtain airbag 5 is mounted to a roof side panel 1 of a vehicle to prevent a driver or passenger from being injured when the vehicle is involved in a side collision. In detail, the curtain airbag 5 is mounted to a side rail 3 of the roof side panel 1 by a mounting bracket 9. An auxiliary bracket 7 which prevents the curtain airbag 5 from being deployed through a gap between the vehicle body and a pillar trim is mounted to the side rail 3 to which the curtain airbag 5 is mounted.

In the vehicle, a headlining which is made of synthetic resin is attached to the ceiling of the compartment of the vehicle. The headlining has an integrated structure and includes a pad and a fabric cover to have an adiabatic function, a soundproofing function and a sound absorption function.

Under normal conditions, the curtain airbag 5 is covered with the headlining and is thus not exposed to the outside. When a side collision occurs, the curtain airbag 5 is deployed through the headlining and covers door glasses, thus preventing foreign substances from directly striking the driver or passenger, and preventing the driver or passenger from being secondarily injured by the undesired removal from the passenger compartment.

Furthermore, the auxiliary bracket 7 which is mounted to the side rail 3 prevents the curtain airbag 5 from being extracted through the gap between the vehicle body and the pillar trim. Therefore, the driver or passenger can be prevented from being injured by incorrect deployment of the curtain airbag 5.

Meanwhile, the mounting bracket of the curtain airbag should be designed in consideration of various conditions. The most important of these conditions are that the mounting bracket must be able to control the direction in which the curtain airbag is deployed and absorb shock. Whether the mounting bracket satisfies these conditions or not can be determined by FMH impact tests. Because these conditions directly affect the safety of the driver or passenger, efforts to overcome the problems of incorrect deployment and unsatisfactory shock absorption ability of the curtain airbag have been continuously made in the process of developing the model of a vehicle. Recently, in North America, laws and regulations pertaining to the performance of the curtain airbag were strengthened. In addition, IIHS of U.S. and NCAP of Germany also proposed strengthened safety standards.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a ramp bracket for a curtain airbag of a vehicle which can enhance deployment performance and shock absorption performance of the curtain airbag.

A ramp bracket for a curtain airbag cushion of a vehicle, may include a cushion storage portion storing the curtain airbag cushion therein, the cushion storage portion having an opening on a first sidewall thereof such that the curtain airbag cushion is deployed through the opening, wherein the first sidewall includes upper and lower surfaces to define the opening, and a shock absorption portion formed under a lower surface of the cushion storage portion and absorbing a shock generated when a passenger collides to the shock absorption portion.

An inner surface of a second sidewall of the cushion storage portion may be rounded and be convex towards the opening of the first sidewall, and junctions between the second sidewall and the upper and lower surfaces of the first sidewall are rounded.

The shock absorption portion may define a shock absorption space therein to elastically absorb the shock generated when the passenger collides to the shock absorption portion.

The shock absorption portion may include an extension portion extending downwards from the second sidewall of the cushion storage portion, and a curved surface, an end of which is coupled to the extension portion and the other end of which extends in a direction and is curved to be fastened to the lower surface of the cushion storage portion such that the shock absorption space is defined by the extension portion and the curved surface.

The other end of the curved surface may be slidably engaged to the lower surface of the cushion storage portion wherein a fastening portion is formed to the extension portion between the lower surface of the cushion storage portion and the end of the curved surface, the fastening portion extending in a predetermined length from the extension portion and the other end of the curved surface is fitted between the lower surface of the cushion storage portion and the fastening portion, wherein a movement allowance space is defined between the lower surface of the cushion storage portion and the fastening portion such that the other end of the curved surface is movable in the movement allowance space when the passenger collides with the shock absorption portion.

Removal prevention protrusions may be respectively provided on a distal end of the fastening portion and under the lower surface of the cushion storage portion, the removal prevention protrusions defining an insert slot therebetween and a hook is provided on the other end of the curved surface, the hook having a front edge rounded to facilitate insertion of the hook into the insert slot, with a locking stop formed on a rear end of the hook, the locking stop being locked to the removal prevention protrusions to prevent the hook from being removed from the insert slot after the hook is inserted into the insert slot, wherein the length of the movement allowance space is larger than the length of the hook.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
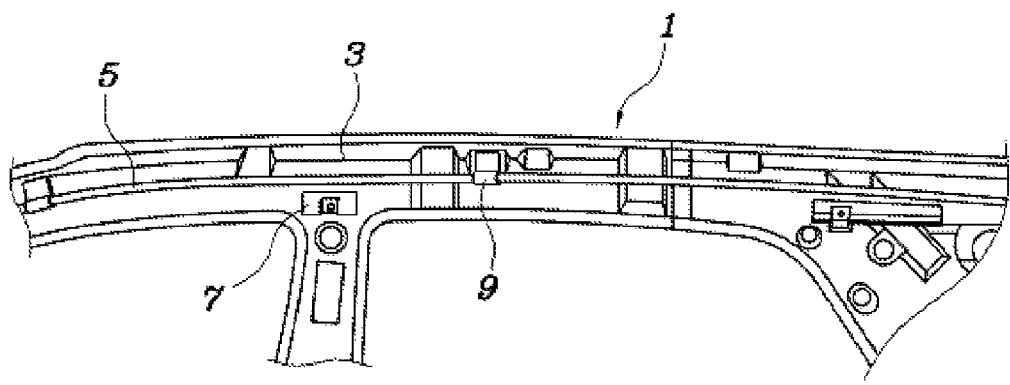
FIG. 1 is a view showing a conventional curtain airbag.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a ramp bracket for a curtain airbag of a vehicle according to an exemplary embodiment of the present invention will be described in detail with reference to the attached drawings.

Figure 2:
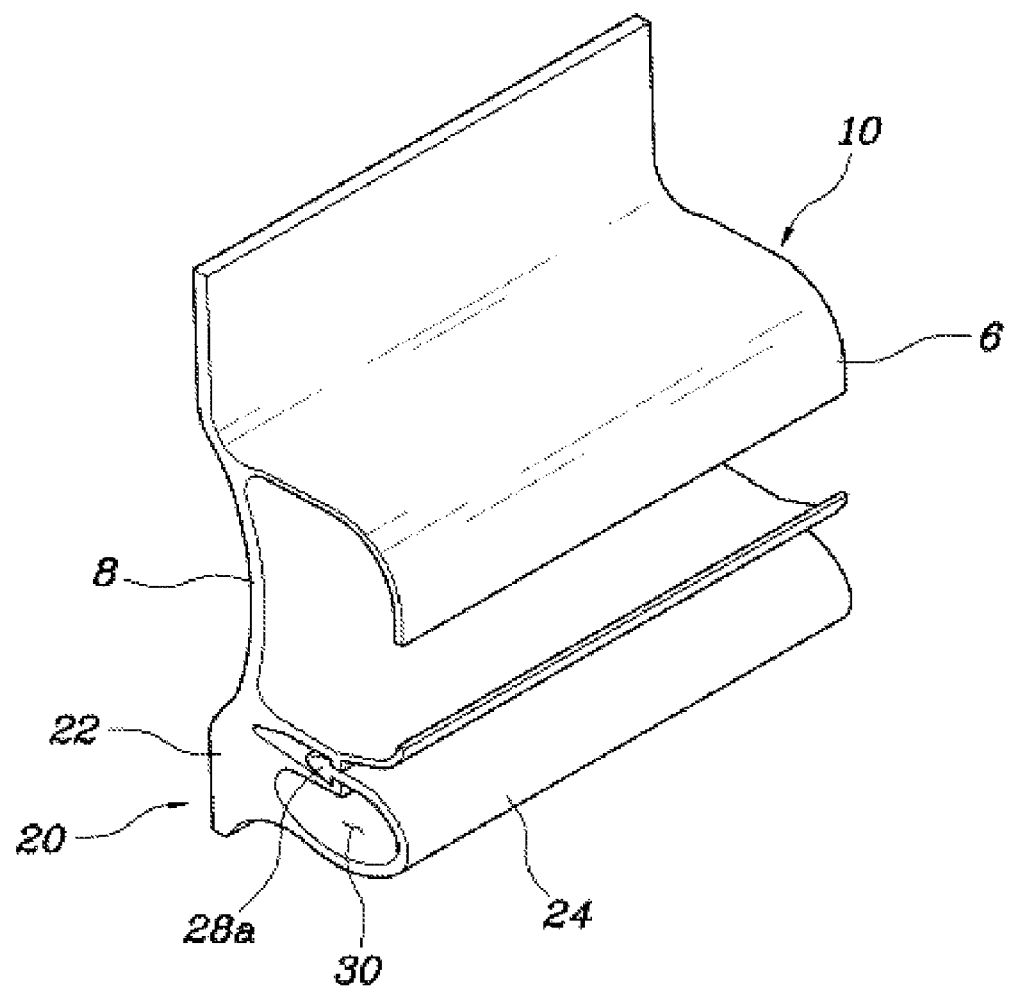
FIG. 2 is a perspective view of an exemplary ramp bracket for a curtain airbag of a vehicle according to the present invention.
Figure 3:
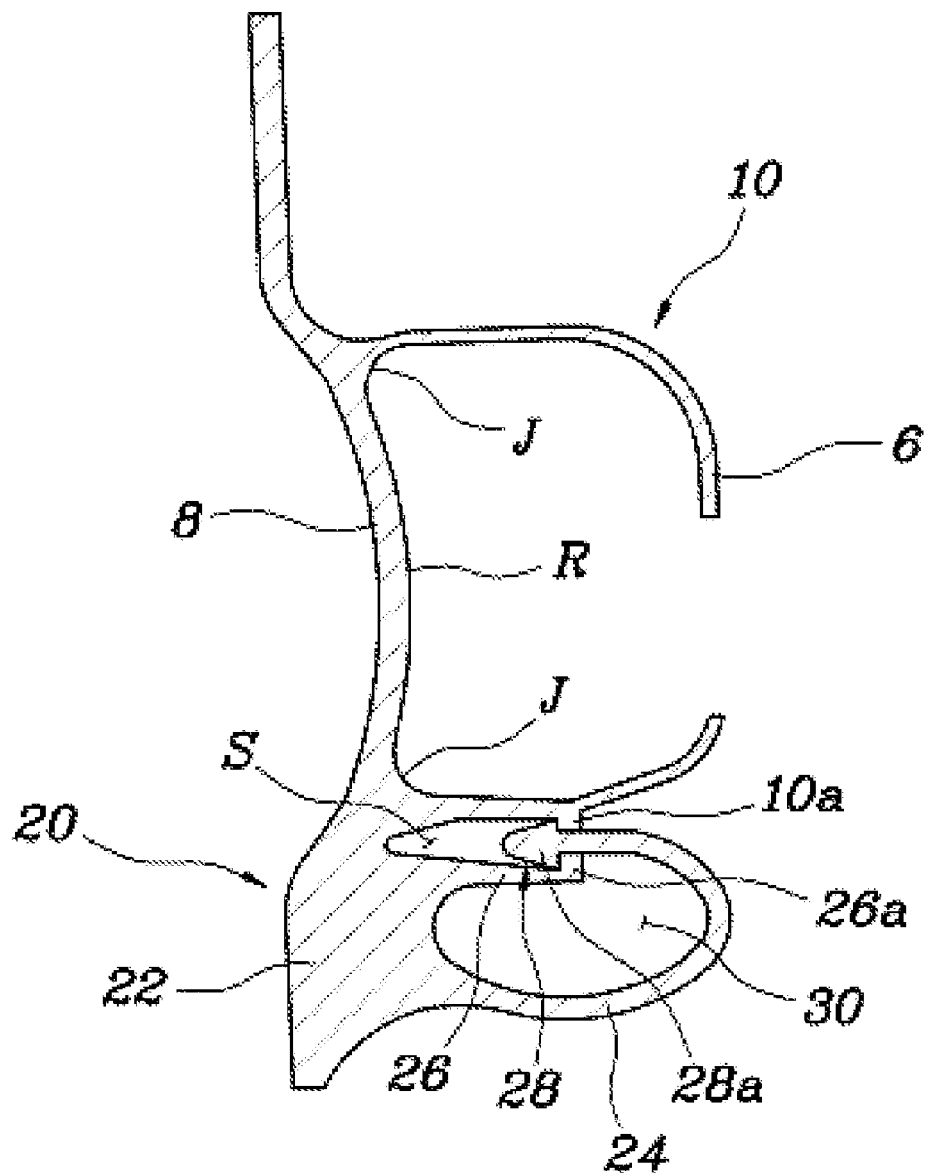
FIG. 3 is a sectional view of the ramp bracket of FIG. 2.
Figure 4:
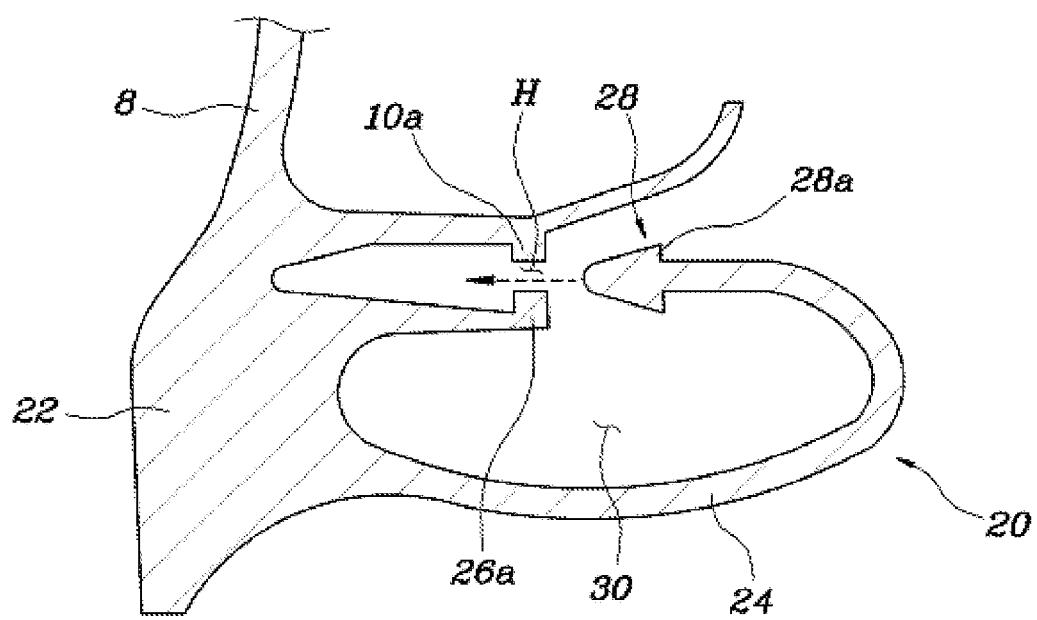
FIG. 4 is a view showing a critical portion of the ramp bracket of FIG. 3.

FIG. 2 is a perspective view of the ramp bracket according to the exemplary embodiment of the present invention. FIG. 3 is a sectional view of the ramp bracket. FIG. 4 is a view showing a critical portion of the ramp bracket.

As shown in FIG. 2, the ramp bracket for the curtain airbag includes a cushion storage portion 10 and a shock absorption portion 20.

A curtain airbag cushion is provided in the cushion storage portion 10. An opening is formed through a first sidewall 6 of the cushion storage portion 10. When the vehicle is involved in a side collision, the curtain airbag cushion is deployed through the opening of the first sidewall 6 of the cushion storage portion 10. Upper and lower surfaces and a second sidewall 8 of the cushion storage portion 10 support the curtain airbag cushion when the curtain airbag cushion is deployed.

The shock absorption portion 20 extends downwards from the lower surface of the cushion storage portion 10. The shock absorption portion 20 functions to minimize the shock generated when a passenger collides with the lower portion of the cushion storage portion 10 owing to a side collision of the vehicle. In other words, the shock absorption portion 20 absorbs the shock when the passenger collides with the cushion storage portion 10, thus minimizing injury to the passenger. The shock absorption portion 20 having this function can absorb shock in a variety of different manners. As a representative example, the shock absorption portion 20 may be configured such that when the passenger collides with the shock absorption portion 20, it can be deformed in shape to absorb the shock.

The ramp bracket for the curtain airbag according to an exemplary embodiment of the present invention will be described in more detail with reference to FIG. 3.

As shown in FIG. 3, in the ramp bracket for the curtain airbag, the cushion storage portion 10 is characterized in that the second sidewall 8 thereof has a round shape R and the junctions J between the second sidewall 8 and the upper surfaces and the lower surfaces are rounded. When the curtain airbag cushion is deployed from the cushion storage portion 10, the round surface (R) of the cushion storage portion 10 supports the curtain airbag cushion. That is, the round surface (R) of the cushion storage portion 10 functions to guide the curtain airbag cushion towards the opening of the first sidewall 6 of the cushion storage portion 10 and enhances the force supporting the curtain airbag cushion.

To achieve the above-mentioned functions, it is preferable that the second sidewall 8 of the cushion storage portion 10 be rounded such that the inner surface thereof is convex towards the opening of the first sidewall 6.

The shock absorption portion 20 has a shock absorption space 30 therein. In other words, because the shock absorption portion 20 has the shock absorption space having a predetermined volume therein, the shock absorption portion 20 can be deformed by the shock generated when the passenger collides with the shock absorption portion 20, thus absorbing the shock.

The shock absorption portion 20 may include an extension portion 22 and a curved surface 24.

The extension portion 22 extends downwards from the second sidewall 8 of the cushion storage portion 10.

The curved surface 24 extends from the extension portion 22 in the direction toward the passenger (toward the passenger compartment of the vehicle), is curved towards the cushion storage portion 10, and is fastened to the lower surface of the cushion storage portion 10.

As such, the shock absorption portion 20 having the shock absorption space therein can be formed by this simple structure.

Furthermore, a fastening portion 26 which extends a predetermined length in the direction toward the passenger is provided between the lower surface of the cushion storage portion 10 and the curved surface 24.

A fastening space is defined between the lower surface of the cushion storage portion 10 and the fastening portion 26. Thus, the curved surface 24 is fastened to the lower surface of the cushion storage portion 10 in such a way as to fit the end of the curved surface 24 into the fastening space.

The fastening space defined between the lower surface of the cushion storage portion 10 and the fastening portion 26 has a volume sufficient to form enough extra space even after the end of the curved surface 24 is fitted into the fastening space. This extra space serves as a movement allowance space S for the end of the curved surface 24.

In other words, when the passenger collides with the shock absorption portion 20, the end of the curved surface 24 moves in the movement allowance space S during the shock absorbing phase, thus more reliably reducing shock transmitted to the passenger.

Meanwhile, removal prevention protrusions 26a and 10a corresponding to each other are respectively provided on the end of the fastening portion 26 and under the lower surface of the cushion storage portion 10. The removal prevention protrusions 26a and 10a respectively protrude upwards and downwards, that is, towards each other.

As shown in FIG. 4, an insert slot H is defined between the removal prevention protrusions 26a and 10a.

A hook 28 is provided on the end of the curved surface 24. The front edge of the hook 28 is rounded such that it can be easily fitted into the insert slot H. Thus, generally, the hook 28 has an arrowhead shape.

Furthermore, a locking stop 28a is formed on the rear end of the hook 28. The locking stop 28a is locked to the removal prevention protrusions 26a and 10a after the hook 28 is inserted into the insert slot H, thus preventing the hook 28 of the curved surface 24 from being undesirably removed from the insert slot H.

Thereby, the curved surface 24 can be maintained in the state of having been inserted into the insert hole H.

As described above, the present invention having the above-mentioned construction enhances deployment performance of a curtain airbag. Furthermore, it is appreciated from FMH (free motion headform) impact tests that shock absorption performance is improved.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A ramp bracket for a curtain airbag cushion of a vehicle, comprising:
    a cushion storage portion storing the curtain airbag cushion therein, the cushion storage portion having an opening on a first sidewall thereof such that the curtain airbag cushion is deployed through the opening, wherein the first sidewall includes upper and lower surfaces to define the opening; and
    a shock absorption portion formed under a lower surface of the cushion storage portion and absorbing a shock generated when a passenger collides to the shock absorption portion;
    wherein the shock absorption portion defines a shock absorption space therein to elastically absorb the shock generated when the passenger collides to the shock absorption portion;
    wherein the shock absorption portion comprises:
        an extension portion extending downwards from the second sidewall of the cushion storage portion; and
        a curved surface, an end of which is coupled to the extension portion and the other end of which extends in a direction and is curved to be fastened to the lower surface of the cushion storage portion such that the shock absorption space is defined by the extension portion and the curved surface; and
    wherein the other end of the curved surface is slidably engaged to the lower surface of the cushion storage portion.

2. The ramp bracket as set forth in claim 1, wherein an inner surface of a second sidewall of the cushion storage portion is rounded and is convex towards the opening of the first sidewall, and junctions between the second sidewall and the upper and lower surfaces of the first sidewall are rounded.

3. The ramp bracket as set forth in claim 1, wherein a fastening portion is formed to the extension portion between the lower surface of the cushion storage portion and the end of the curved surface, the fastening portion extending in a predetermined length from the extension portion and the other end of the curved surface is fitted between the lower surface of the cushion storage portion and the fastening portion, wherein a movement allowance space is defined between the lower surface of the cushion storage portion and the fastening portion such that the other end of the curved surface is movable in the movement allowance space when the passenger collides with the shock absorption portion.

4. The ramp bracket as set forth in claim 3, wherein removal prevention protrusions are respectively provided on a distal end of the fastening portion and under the lower surface of the cushion storage portion, the removal prevention protrusions defining an insert slot therebetween and a hook is provided on the other end of the curved surface, the hook having a front edge rounded to facilitate insertion of the hook into the insert slot, with a locking stop formed on a rear end of the hook, the locking stop being locked to the removal prevention protrusions to prevent the hook from being removed from the insert slot after the hook is inserted into the insert slot.

5. The ramp bracket as set forth in claim 4, wherein the length of the movement allowance space is larger than the length of the hook.

* * * * *